United States Patent [19]

Suzuki

[11] Patent Number: 4,717,598

[45] Date of Patent: Jan. 5, 1988

[54] MANUFACTURING METHOD OF COMPOSITE SHEET MATERIAL HAVING DIFFERENT TYPE OF SURFACES

[75] Inventor: Yasuyuki Suzuki, Tokyo, Japan

[73] Assignee: Suzuki Kanshi Co., Ltd., Tokyo, Japan

[21] Appl. No.: 10,086

[22] PCT Filed: Jul. 4, 1986

[86] PCT No.: PCT/JP86/00346

§ 371 Date: Dec. 8, 1986

§ 102(e) Date: Dec. 8, 1986

[51] Int. Cl.⁴ .................. B05D 1/18; B05D 3/02
[52] U.S. Cl. ..................... 427/374.1; 427/389.8; 427/430.1

[58] Field of Search ............... 427/374.1, 389.8, 430.1

[56] References Cited

U.S. PATENT DOCUMENTS 4,158,070 6/1979 Lewicki et al. ............. 427/374.1 X
4,505,951 3/1985 Kennedy ..................... 427/374.1 X
4,590,102 5/1986 Rogamilia et al. .......... 427/374.1 X Primary Examiner—Michael R. Lusignan
Attorney, Agent, or Firm—Wenderoth, Lind & Ponack

[57] ABSTRACT

A composite sheet material is manufactured by steps of impregnating a synthetic resin in a glass fiber sheet material, heating one surface of material to cure and cooling its other surface to retain as uncured.

1 Claim, 2 Drawing Figures

MANUFACTURING METHOD OF COMPOSITE SHEET MATERIAL HAVING DIFFERENT TYPE OF SURFACES

TECHNICAL FIELD

The present invention relates to a manufacturing method of composite sheet material which is formed by impregnating a synthetic resin in a glass fiber sheet.

BACKGROUND ART

A composite sheet material with a synthetic resin impregnated in a glass fiber sheet material is universally applied as a blank of various industrial products. Such composite sheet material is available in the forms of prepreg material wherein an impregnation resin is retained as uncured and cure material wherein an impregnation resin is fully cured. However, it has never been made in a prior art that a single composite sheet material is provided with surfaces one of which is retained as uncured and other of which is fully cured.

Though it is easy to apply a deformation processing to the prepreg material, the material may not readily accept an automatic punching or mold releasing operations. In turn, though it is easy to punch or release the cure material from a mold, the material may not readily accept a deformation processing and tends to resume its original shape after processed.

Therefore, an extreme industrial benefit will be derived if a composite sheet material possessing advantageous characteristics of above two materials in combination is available to use.

DISCLOSURE OF THE INVENTION

The present invention provides a manufacturing method of composite sheet material wherein one surface is retained as uncured and its other surface is fully cured, by use of glass fiber sheet material with a synthetic resin impregnated therein.

BEST MODE OF CARRYING OUT THE INVENTION

Figure 1:
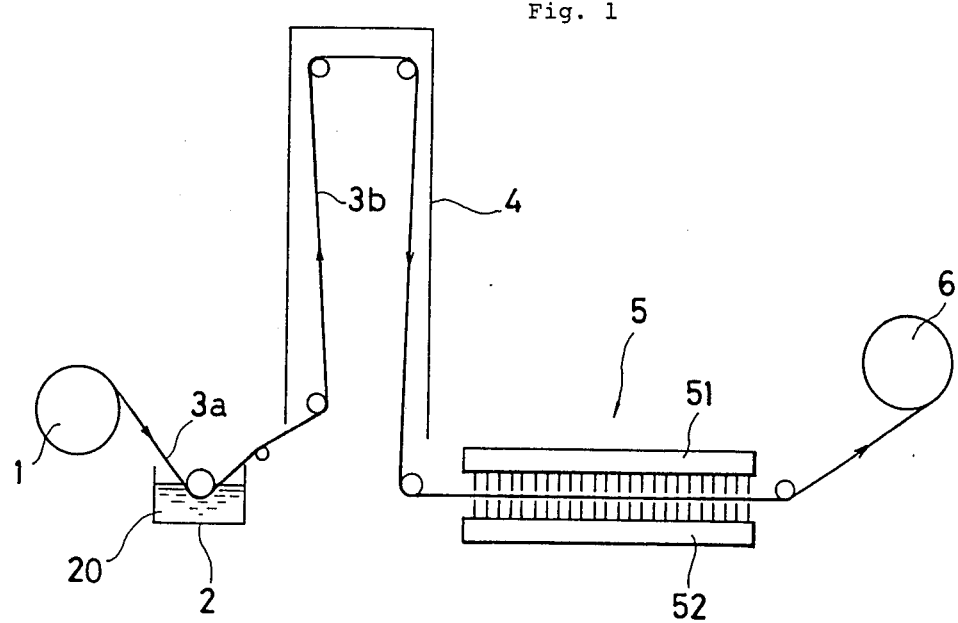
FIG. 1 is a schematic illustrative view of manufacturing method of composite sheet material built in accordance with the present invention.

In accordance with the manufacturing method of composite sheet material of the present invention, a resin is impregnated in a sheet material 3a by moving the sheet material to pass through a tank 2 containing a synthetic resin 20 therein, after the roll 1 of glass fiber sheet material is unwound, as shown in FIG. 1. A resin impregnated sheet material 3b is dried in a dying furnace 4, to place the resin in position. Then, the sheet material 3b dried is moved to a heating and cooling device 5 wherein one surface of material is heated up and its other surface is cooled down. The composite sheet material 3c thus formed is taken up as a roll 6.

Figure 2:
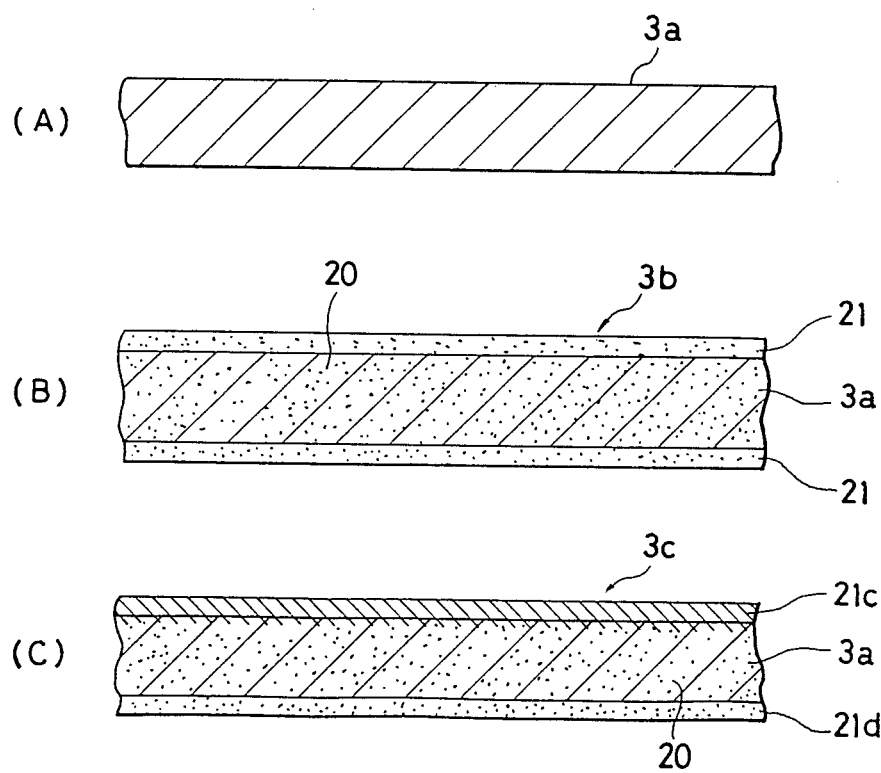
FIG. 2 is a longitudinal cross-sectional view of sheet material in each step of manufacturing method in FIG. 1, illustrating respective conditions of sheet material.

The glass fiber sheet material 3a [FIG. 2(A)] is selected from a commercially available one which has been formed by weaving a glass fiber in a sheet-like configuration.

The synthetic resin is a thermally resistant and hot setting type such as, for example, a polyimide and a phenol butyral compound resin and the like. The resin is contained in the tank 2 in a liquidized state at an ambient temperature. The resin impregnated sheet material 3b is formed by impregnating a resin 20 uniformly into the glass fiber sheet material 3a and causing a resin film 21 to adhere uniformly to upper and lower surfaces of material, as shown in FIG. 2(B).

The drying furnace 4 serves to evaporate the solvent of resin by spraying a hot air moderately against the sheet material 3a. The drying furnace 4 should preferably maintain its internal temperature at 150°–160° C. and its duration time of 5–12 minutes.

The heating and cooling device 5 consists of a heating unit 51 and a cooling unit 52 each of which is arranged to oppose against one surface of sheet material 3b. The heating unit 51 can blow out a very hot air therefrom and cures a resin which has been impregnated in or adhered to the sheet material 3b by directing a very hot air against the surface of sheet material 3b. The layer thus cured is called as a cure layer 21c [FIG. 2(C)] hereinbelow. Preferably, such very hot air should maintain its temperature at 200°–240° C. and its flow rate of 5–8 m$^3$/min.

The cooling unit 52 can blow out a cold air therefrom and retains as uncured a resin which has been impregnated in or adhered to the sheet material 3b by directing a cold air against the surface of sheet material 3b. The layer thus retained as uncured is called as a prepreg layer 21d hereinbelow. Preferably, such cold air should maintain its temperature at $-5°--15°$ C. and its flow rate of 5–8 m$^3$/min.

A time required for the sheet material 3b to pass through the heating and cooling device 5 should preferably be set at 3–6 minutes.

Though it is optional to mount whichever the cooling unit 52 or the heating unit 51 upon the other, their positional relationship should be determined properly, taking into account the curly configuration of material observed in winding into a roll 6.

In accordance with the present invention, it is thus possible to form the cure layer 21c on one surface of the composite sheet material 3c [FIG. 2(C)], and the prepreg layer 21d on its other surface.

INDUSTRIAL APPLICABILITY

The composite sheet material of present invention can find its effective application where a secondary processing must be taken for the prepreg layer of sheet material following the step of deformation processing. As for instance, where the composite sheet material is used to make a voice coil bobbin with its outer surface formed as the prepreg layer, it is possible to carry out a voice coil winding operation in more convenient and precise manner in subsequent steps.

I claim:

1. A manufacturing method of composite sheet material having a different type of surfaces, comprising steps of: impregnating a synthetic resin in a glass fiber sheet material; drying the resin impregnated sheet material; and heating one surface of dry sheet material to form a fully cured surface and simultaneously cooling other surface to retain as an uncured layer.

* * * * *